United States Patent [19]

Harner et al.

[11] Patent Number: 4,909,588
[45] Date of Patent: Mar. 20, 1990

[54] SEALED FIBER OPTIC PROBE

[75] Inventors: Richard S. Harner; Bruce W. Gutzmann, both of Midland, Mich.

[73] Assignee: The Dow Chemical Company, Midland, Mich.

[21] Appl. No.: 236,571

[22] Filed: Aug. 25, 1988

[51] Int. Cl.⁴ .............................................. G02B 6/36
[52] U.S. Cl. ................................ 350/96.20; 350/96.18
[58] Field of Search ................. 350/96.1, 96.20, 96.21, 350/96.22, 96.23, 96.18

[56] References Cited

U.S. PATENT DOCUMENTS

| | | | |
|---|---|---|---|
| 4,214,809 | 7/1980 | Reh | 350/96.20 |
| 4,573,761 | 3/1986 | McLachlan et al. | 350/96.24 |
| 4,707,134 | 11/1987 | McLachlan et al. | 356/342 |

OTHER PUBLICATIONS

Vacuum Sealing Techniques by A. Roth published by Pergamon Press Ltd. in 1966, pp. 306, 307, 311, 400, 401, 402, 738, 739, and 740.

Primary Examiner—Frank Gonzalez
Attorney, Agent, or Firm—John K. McCulloch; Timothy S. Stevens; Burke M. Halldorson

[57] ABSTRACT

A fiber optic probe adapted to be immersed in a fluid medium has an opening at one end in which is accommodated an optical window through which light may be transmitted from and to the optical fibers. Seals between the optical element and the probe body are provided to prevent the leakage of fluid past the window into the probe body. One or more resilient biasing springs constantly apply a yieldable, compressive force on the seals regardless of thermal expansion and contraction of any part of the probe.

22 Claims, 1 Drawing Sheet

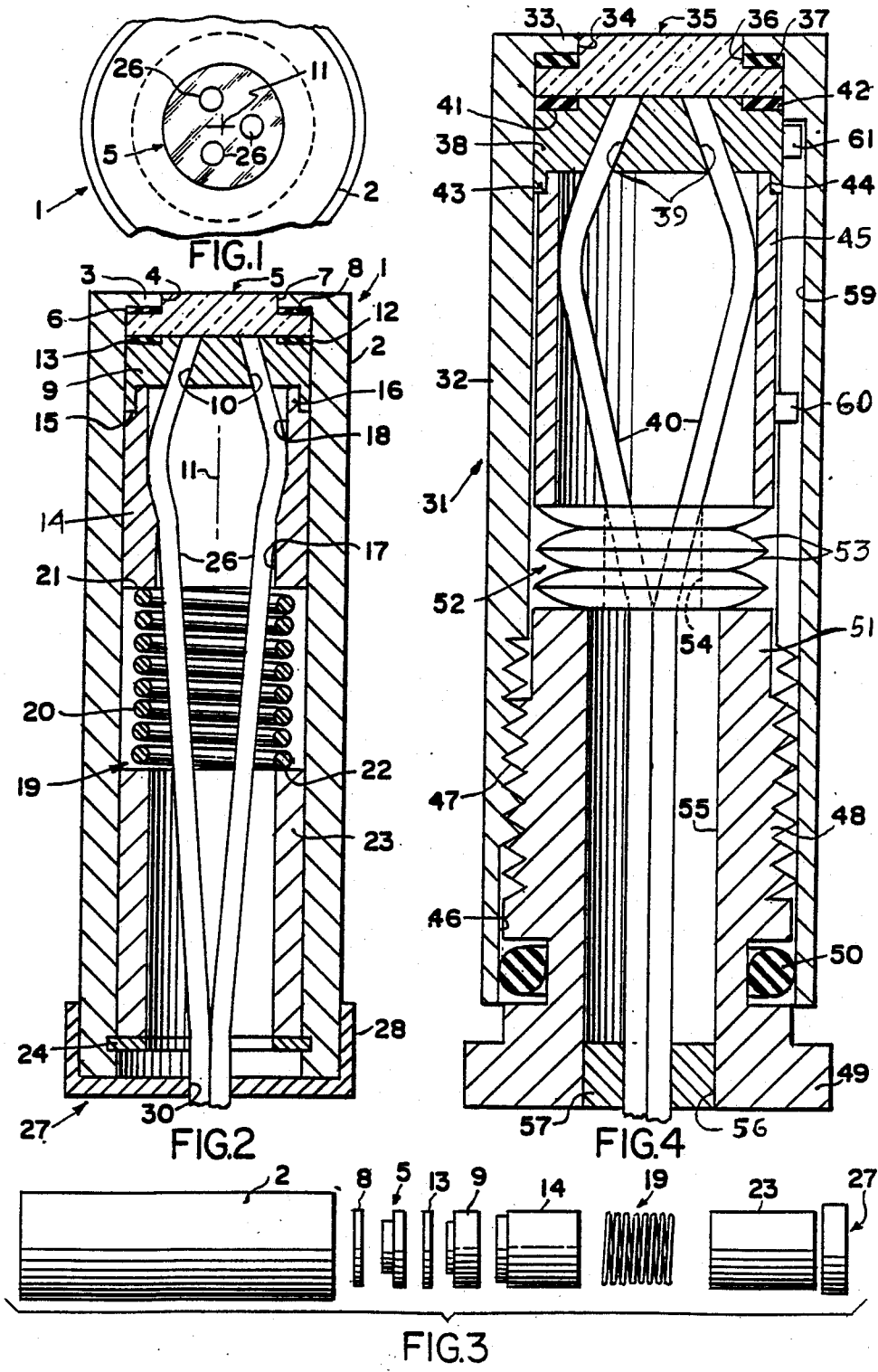

SEALED FIBER OPTIC PROBE

This invention relates to a fiber optic probe having at least one end adapted for immersion in a fluid medium and more particularly to th provision of an improved seal at the immersible end of the probe.

BACKGROUND OF THE INVENTION

Fiber optic probes of the kind adapted for immersion in a fluid medium conventionally are formed of a plurality o materials. Such materials have different thermal expansion and contraction characteristics. To compensate for such differences it has been conventional heretofore to utilize deformable, resilient, elastomeric seals and apply static compression forces on the seals of such magnitude as to prevent leakage.

Examples of conventional sealing techniques are disclosed in U.S. Pat. Nos. 4,573,761 and 4,707,134. Although such seals function satisfactorily for somewhat limited periods of time, they are susceptible to deterioration and consequent leakage after a few months, particularly in those instances in which the probes are used in environments where large temperature variations routinely are encountered and where extensive use and consequent movements of the probes results in relieving the static compressive force applied on the seals.

Deterioration of the seals of conventional constructions may be accelerated in those instances where the sealing structure is subjected to torque tending to rotate either the seals themselves or some structural member in engagement with such seals. Such rotation tends to abrade the seals, thereby hastening their failure.

In combatting the adverse effects of unequal thermal contraction and expansion of different materials, it has been the practice heretofore to utilize materials whose thermal expansion and contraction characteristics were sufficiently similar to minimize the inequalities. This practice, however, sometimes has resulted in having to utilize materials having less than optimum corrosion resistance and/or optical properties.

A principal object of the present invention is to provide a sealed probe construction which overcomes the disadvantages referred to above.

SUMMARY OF THE INVENTION

A sealed probe constructed in accordance with the invention comprises a preferably cylindrical, tubular body one end of which is adapted for immersion in a fluid medium. That end of the body terminates in an inturned annular flange which forms an opening into the body. An optical element occupies the tubular body in underlying relation with the flange and forms a closure for the opening. An annular seal is interposed between the optical element and the flange.

Optical fibers extend into the tubular body from its opposite end and have their free ends fitted into openings formed in a support which is adjacent and confronts the optical closure. An additional sealing gasket is interposed between the fiber optic support and the optical closure.

Resilient biasing means, such as a spring, is accommodated in the tubular body and constantly applies a yieldable force on the gaskets to ensure the formation of a fluid tight seal at that end of the probe body which is adapted for immersion in a fluid medium.

In one embodiment there are no rotatable parts, thereby avoiding the imposition of any torque on the sealing gaskets. In another embodiment the biasing means is stressed by a rotary member, but means is provided to preclude the application of torque on the sealing gaskets.

The biasing force applied on the sealing gaskets is able to compensate for thermal expansion and contraction of the components of which the probe is formed, thereby making it possible to utilize probe materials having optimum optical and corrosion and abrasion resistant properties, as well as enabling the use of sealing materials having optimum sealing characteristics and compatibility with the fluid medium with which the probe is used.

THE DRAWINGS

The presently preferred embodiments of the invention are illustrated in the accompanying drawings wherein:

FIG. 1 is an end elevational view of one embodiment;

FIG. 2 is a vertical sectional view;

FIG. 3 is an exploded view of the apparatus shown in FIG. 2; and

FIG. 4 is a view similar to FIG. 2, but illustrating a modified embodiment.

DETAILED DESCRIPTION

A probe constructed in accordance with the embodiment shown in FIGS. 1–3 is designated generally by the reference character 1 and comprises a tubular, preferably cylindrical body 2 formed of stainless steel or other suitable material and terminating at its forward end in a radially intruded, annular flange 3 forming an opening 4 at that end of the body. Accommodate in the opening 4 is an optical closure or window 5 formed of appropriate material such as glass, quartz, diamond, ruby, zirconia, or sapphire. The window comprises a wafer having a peripheral groove or step 6 which underlies the flange 3 and forms a reduced diameter projection 7 tat extends through the opening 4 and has an outer surface flush with that of the flange 3.

Occupying the groove 6 and interposed therebetween and the flange 3 is an annular sealing gasket 8 formed of a suitable material which is resilient or deformable, and impervious to the fluid medium in which the probe is to be immersed. A suitable material from which the gasket may be formed is a perfluoro elastomer.

Adjacent and confronting the inner surface of the optical closure 5 is a support member 9 formed of brass or other suitable material having a plurality of bores 10 in each of which the free end of an optical fiber may be secured. In the disclosed embodiment there are three openings 10 of uniform diameter equally spaced circumferentially from one another and from the longitudinal axis 11 of the probe body. The openings 10 also converge along lines which intersect the axis 11 at a common point at or beyond the outer surface of the optical closure 5.

That surface of the support 9 which confronts the window 5 has a peripheral groove or step 12 in which is seated a secondary, annular sealing gasket 13 like the gasket 8. The uncompressed thickness of each sealing gasket 8 and 13 is somewhat greater than the depth of its associated groove, as is conventional.

Slideably accommodated in the body 2 is a force transmitting bushing or sleeve 14 having a circumferential groove 15 at that end which confronts the support member 9, and the latter has a circumferential lip 16 which seats in the groove 15. The force transmitting sleeve 14 has a bore 17 which may have its forward end 18 enlarged for a purpose to be explained.

Accommodated within the body 2 is a biasing member 19 comprising a helical compression spring 20. One end 21 of the spring seats upon the inner or rearward end of the sleeve 14 and the opposite end 22 of the spring seats upon a sleeve 23 that is slidably accommodated in the body 2. The sleeve 23 is removably secured in the body 2 by means of a split retaining ring 24 that is accommodated in a groove 25 adjacent the rear end of the probe body.

One or more optical fibers 26 extend into the probe body 2 from its rear end. In the disclosed embodiment, there are three fibers 26, each of which is clad and opaquely jacketed. The jacket is removed from the forward ends of the fibers so as to enable them to be fitted into and snugly retained in the openings 10 formed in the support 9.

Since the forward ends of the fibers converge forwardly and toward the axis of the probe, the bore enlargement 18 is provided to make possible an enlargement of the radius of curvature of the fibers. Rearwardly of the support 9 the fibers extend substantially parallel to the longitudinal axis 11 of the probe and project beyond the rear end of the probe for connection to a light source (not shown) and light detection and measuring means (not shown). The rear end of the probe body may be closed by any suitable cap 27 having a flange 28 which snugly accommodates the rear end of the probe body and an end wall 29 having openings 30 that snugly accommodate the fibers 26.

When the parts of the probe are assembled in the manner shown in FIG. 2, the biasing spring 19 is maintained under compression between the sleeves 14 and 23, and the compressive force of the spring is transmitted by the sleeve 14 and the support 9 to and through the seal 13 to the optical element 5 and thence to the seal 8. The seals 8 and 13 thus will be compressed and deformed radially so as to provide a fluid tight seal between the optical element 5 and the probe body. The secondary seal 13 also positively prevents any leakage of fluid into whatever space may exist between the confronting faces of the members 5 and 9.

If the temperature of the fluid in which the forward end of the probe is immersed causes thermal expansion or contraction of the parts of the probe, the biasing spring can compensate for such expansion or contraction to ensure the integrity of the seal provided by the gaskets 8 and 13.

The embodiment disclosed n FIG. 4 comprises a probe 31 having a body 32 terminating at one end in an annular flange 33 which defines an opening 34 in which is accommodated an optical closure or window 35. The closure 35 has a peripheral groove 36. Interposed between the groove 36 and the flange 33 is a sealing gasket 37 like the gaskets referred to earlier.

Slideably accommodated in the body 32 is a support member 38 having openings 39 like the openings 10 for the accommodation of optical fibers 40 like the fibers 26. The support 38 also has a peripheral groove 41 in which is accommodated a secondary sealing gasket 42 like the gasket 13. The support member 38 includes a rearwardly projecting annular lip 43 that is accommodated in a circumferential groove 44 formed at the forward end of a force transmitting bushing or sleeve 45 which is slideably accommodated in the body 32.

Adjacent its rear end the probe body 32 has a smooth bore 46 which communicates with a threaded bore section 47. In the probe body 32 adjacent the rear end is a threaded abutment or stem 48 which terminates at its rear end in a cap 49. A seal 50 encircles the stem 48 inwardly of the cap 49. The abutment 48 has a forward end portion 51 that is not threaded and extends beyond the threaded bore 47. Interposed between the rear end of the force transmitting sleeve 45 and the forward end 51 of the abutment 48 is biasing means 52 comprising a plurality of concavo-convex spring discs 53. Each of the spring discs has a central opening 54 therein.

The optical fibers 40 extend rearwardly through the probe body 33 and pass through the openings 54 formed in the spring discs 53 and through bores 55 and 56 in the abutment 48 and the cap 49. Those ends of the fibers which extend rearwardly beyond the cap 49 are connected to a light source (not shown) and light detection and measuring means (not shown). The bore opening in the cap 49 may be closed by a suitable sealing material 57 so as to seal the bore 56 and support the fibers 40.

When the parts are assembled in the manner shown in FIG. 4, the spring discs 53 will be under compression between the members 45 and 48. Such force will be transmitted by the member 45 through the support 38 and the optical element 35 to the sealing gaskets 37 and 42, respectively, so as to ensure a fluid tight seal at the forward end of the probe and between the members 35 and 38. The force applied to the sealing members may be adjusted by rotation of the cap 49, which rotation will be transmitted to the spring discs 53 by the stem 48.

It is preferred to prevent any possibility of rotation of the abutment 48 being transmitted via the biasing means 52, the force transmitting member 46, and the support 38 to the sealing gaskets 37 and 42. This objective may be achieved in a number of ways, such as by lubricating the spring discs 53 and the confronting ends of the abutment 48 and the member 45. It also is possible to prevent the transmission of torque to the sealing gaskets by providing the inner surface of the probe body 32 with an elongate keyway 59 in which are slideably accommodated radially projecting keys 60 and 61 on the members 45 and 38, respectively. The keyway and key construction will enable the force of the compressed biasing means 52 to be transmitted axially of the probe to the sealing gaskets, but positively will preclude the application of any torque on the sealing gaskets, thereby avoiding abrading of the gasket material because of relative rotation between the gaskets and any other part of the probe.

The operation of the embodiment shown in FIG. 4 is the same as that of the earlier described embodiment. In the embodiment of FIG. 4, however, the force applied by the biasing means 52 may be adjusted quite easily by rotation in one direction or the other of the cap 49, and the applied force may be determined, if desired, by means of a torque wrench. In each embodiment the resilience of the biasing means enables the parts of the probe to expand and contract without affecting the integrity of the seals at the forward end of the probe and between the window and the fiber support.

We claim:

1. A probe comprising a tubular body having an opening at one end thereof; a closure slideably accommodated in said body and occupying said opening; seal means interposed between said body and said closure; and resilient biasing means acting on said closure and constantly biasing said closure in a direction to compress said seal means between said closure and said body and form a fluid tight seal at said one end of said body.

2. The probe according to claim 1 wherein said biasing means comprises spring means.

3. The construction according to claim 2 wherein said spring means is helical.

4. The probe according to claim 2 wherein said spring means comprises a concavo-convex disc.

5. The probe according to claim 1 including a slideable bushing interposed between said biasing means and said closure for transmitting force from said biasing means to said closure.

6. The probe according to claim 5 including means for preventing rotation of said bushing relative to said body.

7. The probe according to claim 1 wherein said closure comprises an optical element.

8. The probe according to claim 7 including a flange at said one end of said body, said optical element having a groove therein confronting said flange, said seal means being accommodated in said groove.

9. The probe according to claim 8 wherein said seal means has an uncompressed thickness greater than the depth of said groove.

10. The probe according to claim 1 including at least one optical fiber accommodated in said body and having a free end; and support means within said body for maintaining said free end of said fiber in a position confronting said closure.

11. The probe according to claim 10 including means for precluding rotation of said support means relative to said body.

12. The probe according to claim 10 wherein said support means is slideable within said body and bears upon said closure; and additional seal means interposed between said support means and said closure and being responsive to said biasing force to effect a seal between said closure and said support means.

13. The probe according to claim 12 wherein said support means has a groove therein confronting said closure and in which said additional seal means is accommodated, said additional seal means having an uncompressed thickness greater than the depth of said groove.

14. A fiber optic probe comprising a tubular body terminating at one end in an annular flange forming an opening in communication with the interior of said body; an optical closure of such size as to close said opening and being slideably accommodated in said body in confronting relation with said flange; deformable first seal means interposed between said closure and said flange; at least one optical fiber extending into said body from its opposite end an having a free end terminating adjacent said closure; slideable support means supporting said free end of said fiber in a position relative to said closure to enable light to be transmitted through said closure to or from said fiber; additional deformable seal means interposed between said support means and said closure for sealing any space between said support means and said closure; resilient biasing means; and force transmitting means slideably interposed between said biasing means and said support means for transmitting biasing force from said biasing means to said support means and said closure to compress said first seal means and said additional seal means and form seals between said closure and said body on opposite sides of said closure.

15. The fiber optic probe according to clam 14 wherein said biasing means comprises spring means.

16. The fiber optic probe according to claim 15 wherein said spring means is helical.

17. The fiber optic probe according to claim 15 wherein said spring means comprises at least one concavo-convex disc.

18. The fiber optic probe according to claim 14 including abutment means supported by said body adjacent its opposite end and against which said biasing means bears.

19. The fiber optic probe according to claim 18 wherein said abutment means is adjustable longitudinally of said body.

20. The fiber optic probe according to claim 19 wherein said abutment means is rotatable relative to said body.

21. The fiber optic probe according to claim 20 including means for precluding rotation of said support means relative to said body.

22. The fiber optic probe according to claim 20 including means for precluding rotation of said force transmitting means relative to said body.

* * * * *